United States Patent
Gonnet et al.

(10) Patent No.: US 11,046,163 B2
(45) Date of Patent: Jun. 29, 2021

(54) GLAZING WITH PROFILED SEAL AND TRIM AND METHOD OF MANUFACTURING THE GLAZING

(71) Applicant: SAINT-GOBAIN GLASS FRANCE, Courbevoie (FR)

(72) Inventors: Romain Gonnet, Lacroix Saint Ouen (FR); Yoann Machizaud, Aubagne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 235 days.

(21) Appl. No.: 16/305,692

(22) PCT Filed: May 11, 2017

(86) PCT No.: PCT/FR2017/051136
§ 371 (c)(1),
(2) Date: Nov. 29, 2018

(87) PCT Pub. No.: WO2017/207885
PCT Pub. Date: Dec. 7, 2017

(65) Prior Publication Data
US 2020/0324634 A1   Oct. 15, 2020

(30) Foreign Application Priority Data
May 30, 2016 (FR) ...................................... 1654841

(51) Int. Cl.
*B60J 10/70* (2016.01)
*B60R 13/04* (2006.01)
(Continued)

(52) U.S. Cl.
CPC ............... *B60J 10/70* (2016.02); *B60R 13/04* (2013.01); *B29L 2031/302* (2013.01);
(Continued)

(58) Field of Classification Search
CPC ........ B60J 10/70; B60J 10/235; B60J 10/265; B60J 10/30; B60R 13/04; B29L 2031/302
See application file for complete search history.

(56) References Cited

U.S. PATENT DOCUMENTS

| | | | | |
|---|---|---|---|---|
| 4,278,286 A | * | 7/1981 | Kiba | ....................... B60J 10/265 296/93 |
| 5,146,658 A | * | 9/1992 | Devismes | ............... B60R 13/04 24/292 |

(Continued)

FOREIGN PATENT DOCUMENTS

| | | |
|---|---|---|
| DE | 27 16 071 A1 | 10/1978 |
| DE | 28 21 095 A1 | 11/1979 |

(Continued)

OTHER PUBLICATIONS

International Search Report as issued in International Patent Application No. PCT/FR2017/051136, dated Sep. 11, 2017.

*Primary Examiner* — Rodney Mintz
(74) *Attorney, Agent, or Firm* — Pillsbury Winthrop Shaw Pittman LLP (57) ABSTRACT

A glazing includes a glazed element, at least one profiled seal portion, at least one trim having an elongate shape and which has a base and at least one flange, the base being situated above an exterior face of the profiled seal portion, wherein the flange includes, at an opposite end to the base, at least one tab which is present in the profiled seal portion while penetrating the profiled seal portion via a hole that opens onto the exterior face and does not open onto an interior face of the profiled seal portion and the tab being wholly in contact with the profiled seal portion.

13 Claims, 3 Drawing Sheets

(51) Int. Cl.
  *B60J 10/235* (2016.01)
  *B60J 10/265* (2016.01)
  *B60J 10/30* (2016.01)
  *B29L 31/30* (2006.01)

(52) U.S. Cl.
  CPC ............ *B60J 10/235* (2016.02); *B60J 10/265* (2016.02); *B60J 10/30* (2016.02)

(56) References Cited

U.S. PATENT DOCUMENTS

| | | | | |
|---|---|---|---|---|
| 5,385,703 | A * | 1/1995 | Shanok | B29C 48/12 264/145 |
| 5,453,309 | A * | 9/1995 | Shanok | B29C 48/12 428/31 |
| 7,950,186 | B2 * | 5/2011 | Gross | B60R 13/06 49/492.1 |
| 8,371,069 | B2 * | 2/2013 | O'Sullivan | B60J 10/30 49/492.1 |
| 8,505,262 | B2 * | 8/2013 | Senge | B60J 10/70 52/716.5 |
| 8,904,735 | B2 * | 12/2014 | Grandgirard | B60J 10/27 52/745.15 |
| 8,925,996 | B2 * | 1/2015 | Senge | B60J 10/265 296/146.15 |
| 8,979,164 | B2 * | 3/2015 | Jabra | B60J 10/235 296/93 |
| 9,027,284 | B2 * | 5/2015 | Murree | B60J 10/265 49/495.1 |
| 9,956,853 | B2 * | 5/2018 | Gonnet | B60J 1/008 |
| 10,363,887 | B2 * | 7/2019 | Gonnet | B60J 10/265 |
| 10,507,512 | B2 * | 12/2019 | Yanai | B21D 53/74 |
| 2008/0110101 | A1 * | 5/2008 | Gross | B60R 13/06 49/489.1 |
| 2010/0011670 | A1 * | 1/2010 | O'Sullivan | B60J 10/88 49/489.1 |
| 2010/0237644 | A1 * | 9/2010 | Senge | B60J 10/30 296/1.08 |
| 2012/0144751 | A1 * | 6/2012 | Schapitz | B60J 10/265 49/431 |
| 2012/0153659 | A1 * | 6/2012 | Senge | B60J 10/265 296/93 |
| 2012/0228448 | A1 * | 9/2012 | Jabra | B60J 10/235 248/221.11 |
| 2013/0186018 | A1 * | 7/2013 | Grandgirard | B60J 1/10 52/204.72 |
| 2013/0305612 | A1 | 11/2013 | Murree et al. | |
| 2016/0185189 | A1 * | 6/2016 | Gonnet | B60J 1/006 52/204.55 |
| 2017/0348918 | A1 * | 12/2017 | Barrenscheen | B60R 13/04 |
| 2017/0349118 | A1 * | 12/2017 | Gonnet | B60R 13/06 |
| 2018/0272413 | A1 * | 9/2018 | Yanai | B60J 10/265 |

FOREIGN PATENT DOCUMENTS

| | | |
|---|---|---|
| DE | 20 2010 001223 U1 | 4/2010 |
| EP | 1 944 182 A1 | 7/2008 |
| FR | 2 340 217 A1 | 9/1977 |
| FR | 2 687 964 A1 | 9/1993 |
| WO | WO 2015/015119 A1 | 2/2015 |

* cited by examiner

GLAZING WITH PROFILED SEAL AND TRIM AND METHOD OF MANUFACTURING THE GLAZING

CROSS-REFERENCE TO RELATED APPLICATIONS

This application is the U.S. National Stage of PCT/FR2017/051136, filed May 11, 2017, which in turn claims priority to French patent application number 1654841 filed May 30, 2016. The content of these applications are incorporated herein by reference in their entireties.

The present invention relates to a glazing comprising a glazed element, at least one profiled seal portion and at least one trim having an elongate shape which extends along an edge of said glazed element and having in cross section an overall shape with a base and at least one flange extending from said base, said base being situated, when the trim is fitted on the glazing, above an exterior face of said profiled seal portion and said trim being fixed to said profiled seal portion with no intermediate fixing element.

The present invention also relates to a method of manufacturing the corresponding glazing.

Throughout the present document, the expression "trim" denotes an accessory of the glazing, particularly an accessory of elongate shape; it does not denote part of the vehicle bodywork. Such a trim is used to visually demarcate the edge of the glazing, when viewed from the outside; it often has a bright metallic ("chromed") appearance or a colored appearance.

It is known practice to use trims made up of U-shaped profiles which are clip-fastened onto intermediate clips which are themselves attached to the profiled seal portion which is made for example of a flexible polymer and is present at the periphery of the glazing.

French patent application No. FR 2 340 217 is known prior art in this respect. In that document, the intermediate clip is a clip fastener.

From elsewhere, in particular from certain alternative forms presented in European patent application No. EP 1 944 182, it is known for a trim to be fixed directly to a profiled bead without an intermediate clip.

That document discloses that at least one retaining element, in particular in the form of an arrowhead, may be introduced into a hole formed beforehand on the exterior face of the seal portion, it being possible for this hole to open onto the interior face of the seal portion; this retaining element is situated, in its final position, inside the seal portion, just partially in contact with the seal portion because the hole that accommodates it is larger: that document explains that it is absolutely essential to provide a cavity or a channel under the retaining portion of the seal portion; this cavity/channel necessarily meaning that part of the head of the retaining element is not in contact with the material of the seal portion.

That document also explains that the seal portion is first of all manufactured on its own, then the retaining element is introduced via a perforation so that its head lies in the cavity/the channel; that means that the manufacture of the seal portion is very complicated because it is necessary to provide special means to ensure that this cavity/channel can exist.

This retention solution offers the advantage that it can be adopted when the space available between the periphery of the glazing and the adjacent bodywork is small.

However, the fixing of the trim using this retaining element is not sufficiently reliable: even if several retaining elements are provided, the trim can easily be removed because all that is required is the application of a movement in the same direction but in the opposite sense to the movement used to introduce the retaining elements into the holes.

Elsewhere it is known practice to provide an adhesion-promoting layer between an interior face of the trim and an exterior face of the profiled seal portion so that this interior face will adhere to this exterior face; however, the application of this layer makes the manufacturing method more complex and leads to an increase in cost.

A glazing of the type mentioned hereinabove, in which a flange comprises, at an opposite end to said base, at least one perforated tab which passes through said profiled seal portion via a hole that opens onto an exterior face and onto an interior face of said profiled seal portion, said perforated tab being bent over under said profiled seal portion or under said glazed element is known from the prior art from patent application WO 2015/015119.

According to that document, the perforated tab of the trim is thus introduced, after the profiled seal portion has been manufactured, through the inlet of the hole which is situated on the exterior face of the seal portion and this tab then reemerges from the hole via the interior face of the seal portion so that it can be bent over against this interior face of said profiled seal portion or against an interior face of said glazed element and allow the trim to be held under the profiled seal portion so that it remains correctly positioned over the profiled seal portion.

The trim is very well retained after the perforated tab or tabs has or have been bent over, but this solution is complicated to implement and leads to a reject rate that is higher than might be desired, because of the complexity of the mold at the site of the hole that accommodates each perforated tab.

It is an object of the present invention to overcome the disadvantages of the prior art by proposing a trim that can be fixed non-removably in a simple, quick and reliable way to a seal portion and particularly when the space available between the periphery of the glazing and the adjacent bodywork is small.

It is a particular object of the invention to make it possible for the trim not to be able to be detached from the glazing as long as the glazing is fixed to the bodywork of the vehicle.

It is another object to make the industrial implementation of the solution easier and to produce very reliably, with a very low reject rate.

The present invention thus relies upon a solution whereby the trim is provided with at least one tab and, during manufacture of the profiled seal portion by molding, this tab is fully incorporated into the profiled seal portion without passing completely through it; the position of this tab with respect to the trim that bears it and with respect to the profiled seal portion in which it is incorporated being fixed, which means to say non-modifiable and not modified without damaging the profiled seal portion.

The tab, together with the flange that bears it, thus both belong to the trim; the tab, together with the flange that bears it, are formed as integral parts of the base of the trim.

One significant advantage of the invention is that the tab according to the invention, which is fully incorporated into the profiled seal portion, creates a mechanical attachment into this profiled seal portion for the trim. Thus, there is no need to provide an adhesion-promoting layer between an interior face of the trim and an exterior face of the profiled seal portion that faces it; according to the invention, there is therefore no adhesion between the trim and the profiled seal portion.

The present invention relates, in its broadest sense, to a glazing as claimed in claim 1. The other claims set out advantageous alternative forms. This glazing comprises a glazed element, at least one profiled seal portion and at least one trim having an elongate shape which extends along an edge of said glazed element and which in cross section has an overall shape with a base and at least one flange extending at a non-zero angle from said base, said base being situated above an exterior face of said profiled seal portion.

This glazing is notable in that said flange of said trim comprises, at an opposite end to said base, at least one tab which is present in said profiled seal portion while penetrating said profiled seal portion via a hole that opens onto said exterior face and does not open onto an interior face of said profiled seal portion and said tab being wholly in contact with said profiled seal portion.

This contact is such that the material of the profiled seal portion touches the entire surface of the tab, over its entire height, on both sides and over its entire thickness, from the end of the flange that bears the tab right down to the bottom. The hole that accommodates the tab thus has a shape that complements the tab, which can be seen by the naked eye if the material of the profiled seal portion is cut away at this point.

Said tab is fully present in said profiled seal portion.

When it is explained that said tab is wholly in contact with said profiled seal portion that also of course means that, conversely, said profiled seal portion is wholly in contact with said tab; said tab is embedded in said profiled seal portion; there is no cavity or channel in the profiled seal portion to accommodate part of said tab.

The trim is fixed to said profiled seal portion directly, with no intermediate fixing element and no layer promoting the adhesion between the trim and the profiled seal portion and the non-removable and purely mechanical fixing of the trim in the profiled seal portion is effective.

The concept of a hole that opens onto the exterior face of the profiled seal portion and via which the tab penetrates this seal portion refers to the fact that in this exterior face, the internal section of the hole is very exactly identical to the external section of the tab at this point.

The tab may have, along its entire length, on the inside of the profiled seal portion, an external section identical to the internal section of the hole on the exterior face of the profiled seal portion; however, it is preferable that, on the inside of the profiled seal portion, at least one external section of the tab is greater than a/the internal section of the hole on the exterior face of the profiled seal portion so that the tab is better retained, mechanically, inside the profiled seal portion.

The base may be flat or slightly curved along its width; a flange may be flat or slightly curved along its width.

For preference, said flange extends at a transverse end of said base, namely from a transverse end of said base. Thus, when the trim is observed in cross section, what distinguishes a flange from the base is the presence, between the two and at the end of each, of a pronounced elbow, namely a significant variation in angle, greater than the potential overall curvature of the base or of the flange. The trim is thus easier and less expensive to manufacture.

For preference, said tab is solid; it is not perforated; it has no aperture, namely hole, passing through the thickness of the tab. If it did, it would then be difficult to control the complete filling of this hole with the material of the profiled seal portion.

Said tab, or each tab, is preferably in the continuation of said flange, so as to make the manufacture of said trim easier; this tab, or each tab, is preferably formed as an integral part of said flange; the trim is preferably a single piece of metal made up of a simple (not bent in half) folded metal sheet.

For preference, said tab, or each tab, is flat and lies in the continuation of the flange of the trim that bears it, which means to say that its thickness where it connects to the flange is identical to, and in the continuation of, the thickness of the flange at this point.

In order for the fixing of the trim to be sufficiently reliable, it is preferable for said tab, or each tab, to have the overall shape of an inverted T, a trunk of the T being formed as an integral part of said flange. Thus, it is impossible to remove the tab without applying a very significant force, which means that the hole and therefore the profiled seal portion has to become damaged.

In order to improve this fixing still further, it is possible for this tab, or each tab, to have the overall shape of an inverted T with:

at least one branch of the T chamfered toward the trunk, and preferably for both branches of the T each to be chamfered toward the trunk, so as to improve the retention of the trim by the tab in the profiled seal portion, and/or at least one branch of the T which has at least one tooth extending toward said flange, so as to improve the retention of the trim by the tab in the profiled seal portion, and/or at least one branch of the T which is parallel to the end of the flange on its opposite edge to said end of the flange, so as to make it easier for the material of the seal portion to spread as it is being molded.

In order for the fixing to be sufficiently reliable, said tab preferably has a thickness identical to that of said flange and a length comprised between 0.5 and 2 times its height measured from the end of said flange.

It is possible for said profiled seal portion to have, on the interior face, a boss facing said tab. Thus, the volume of the seal portion in which the tab is embedded is greater and the retention of the tab in the profiled seal portion is better.

The overall width of this boss is greater than the overall width L of said tab by approximately 1.5 to 4 mm on each side (namely approximately 3 to 8 mm overall) so as to anchor the tab firmly while at the same time economizing on profiled seal portion material.

In order to further improve the mechanical retention effect, said profiled seal portion is preferably in contact with said flange over at least part of its height, and preferably in contact on each longitudinal side of said flange, over at least part of its height.

Said profiled seal portion may in particular be in contact with said flange over its entire height and preferably in contact on each longitudinal side of said flange over its entire height.

Said profiled seal portion is preferably in contact with an interior surface of said base, without any adhesion-promoting layer interposed between said base and said profiled seal portion.

The base and the flange at least which comprises at least one tab each have an elongate plate shape. The base is preferably solid, without aperture; the flange is preferably solid, without aperture.

The base and the flange at least which comprises at least one tab are oriented relative to one another at a non-zero angle which is preferably close to a right angle; this angle may, when the trim is viewed in cross section, be comprised between 60° and 120°; this angle may be rounded. For example, the trim may then in cross section have the overall shape of an L with a rounded corner angle between the single flange and the base.

When the trim comprises two flanges at least one or even both of which comprises (comprise) at least one tab, the angle between each flange and the base is a non-zero angle which may be close to a right angle; each angle may, when the trim is viewed in cross section, be comprised between 60° and 120°; each angle may be rounded. For example, the trim may then in cross section have the overall shape of a U with a rounded angle between each flange and the base.

This U is positioned upside down on or over the profiled seal portion (which means to say on or over the exterior face of the profiled seal portion) with a hollow part of the U facing toward said profiled seal portion.

For preference, part of the interior face of the base of the U of the trim is in contact with part of the exterior face of the profiled seal portion, in particular along a part furthest toward the outside of a boss of the profiled seal portion.

The flange or flanges extends or extend from the base; the base and the flange or flanges are thus joined together to form the trim.

When the trim comprises two flanges, the distal flange is the flange of the trim that is furthest away from the glazed element when mounted.

According to a first, independent, alternative form, viewed in cross section, particularly at the point at which a tab is present, said trim has the overall shape of a U, with a first flange which comprises at least said tab and a second flange which penetrates a cavity formed on the exterior face of said profiled seal portion and which does not open onto the interior face of said profiled seal portion. This second flange, which is preferably longitudinal, is able with this cavity which is then preferably likewise longitudinal, to realize a back-pressure support.

In this first alternative form, it is possible for said second flange to be proximal, which means to say the one closest to the glazed element when mounted, and for said first flange to be the distal flange, namely the one furthest away from the glazed element when mounted, so that the tab is more readily embedded in the material of the profiled seal portion; however, it is equally possible to achieve the opposite.

In a second, independent, alternative form, viewed in cross section, particularly at the point at which a tab is present, said trim has the overall shape of an L, with the base penetrating a cavity formed on the exterior face of said profiled seal portion and not opening onto the interior face of said profiled seal portion. This cavity thus likewise forms a back-pressure support.

In an independent third alternative form, viewed in cross section, particularly at the point at which a tab is present, said trim has the overall shape of a U, with
- a first flange which comprises, at an opposite end to said base, at least said tab, this first tab being present in said profiled seal portion while penetrating said profiled seal portion via a hole that opens onto said exterior face and does not open onto an interior face of said profiled seal portion and said tab being wholly in contact with said profiled seal portion, and
- a second flange which at an opposite end to said base comprises at least one second tab, said second tab being present in said profiled seal portion while penetrating said profiled seal portion via a hole that opens onto said exterior face and does not open onto an interior face of said profiled seal portion and said second tab being wholly in contact with said profiled seal portion.

These three alternative forms are not mutually exclusive because it is possible for a trim to comprise one alternative form at one point and another alternative form at another point along its length, or even yet another alternative form at another point along its length.

It is also possible for the trim to comprise more than two flanges at a point or along its entire length; for example, the trim may have the overall shape of a U with, approximately in the middle of the base, a third flange extending from the base, on the same side as the other two with respect to the profiled seal portion. It is possible to equip this third flange with a tab or with several tabs according to the invention. Potentially, it is possible for only this third flange to comprise tabs according to the invention.

The present invention also relates to a method of manufacturing a glazing according to the invention, said glazing comprising a glazed element, at least one profiled seal portion, at least one trim having an elongate shape which extends along an edge of said glazed element and, in cross section, having a shape with a base and at least one flange extending at a non-zero angle from said base, said method being notable in that said flange comprises, at an opposite end to said base, at least one tab and in that said profiled seal portion is formed by molding on said glazed element wholly in contact with said tab.

Said profiled seal portion preferably has a hole to accommodate said tab and which is formed at the time of molding to open onto an exterior face but not onto an interior face of said profiled seal portion.

Said profiled seal portion is preferably formed by molding on said glazed element in contact with said flange over at least part of its height, and preferably in contact on each longitudinal side of said flange.

Said profiled seal portion is preferably formed by molding on said glazed element in contact with an interior surface of said base; there is no adhesion-promoting layer interposed between said base and said profiled seal portion.

The hole in the seal portion in which hole the tab is present is formed automatically during the manufacture of said profiled seal portion by molding, particularly when this profiled seal portion is manufactured using an encapsulation technique. When the material of the profiled seal portion is introduced into the molding cavity containing the trim, this material comes wholly into contact with the tab, or even into contact with part of the flange bearing the tab.

Several embodiments of the present invention will be described hereinafter by way of nonlimiting examples with reference to the attached drawings in which.

Figure 3:
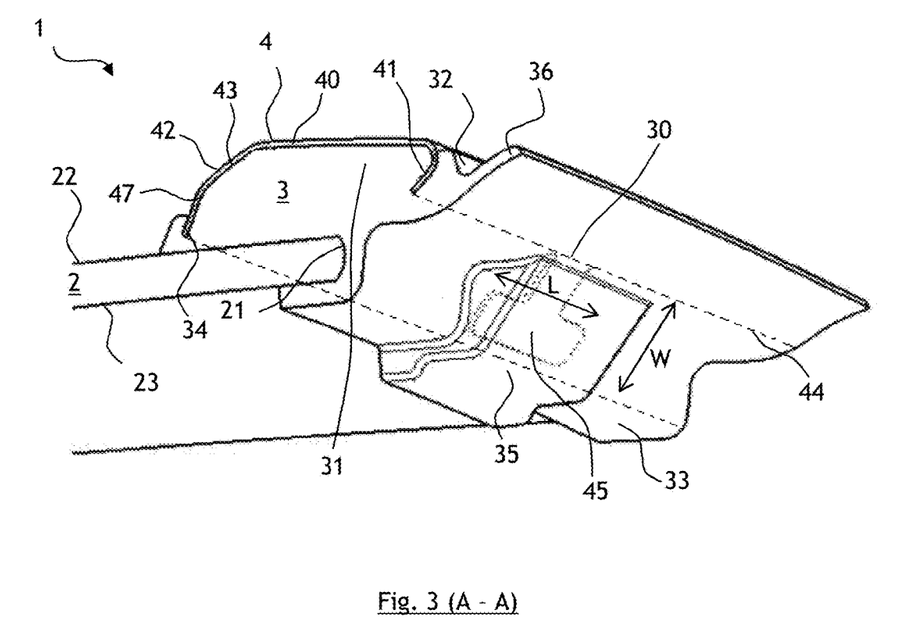
FIG. 3 is a partial view, in perspective and in section on AA of FIG. 2.

In these figures, individual elements in each figure are drawn to scale, but the elements in the background are generally not included, except in FIG. 3, in order to make them easier to study.

Figure 1:
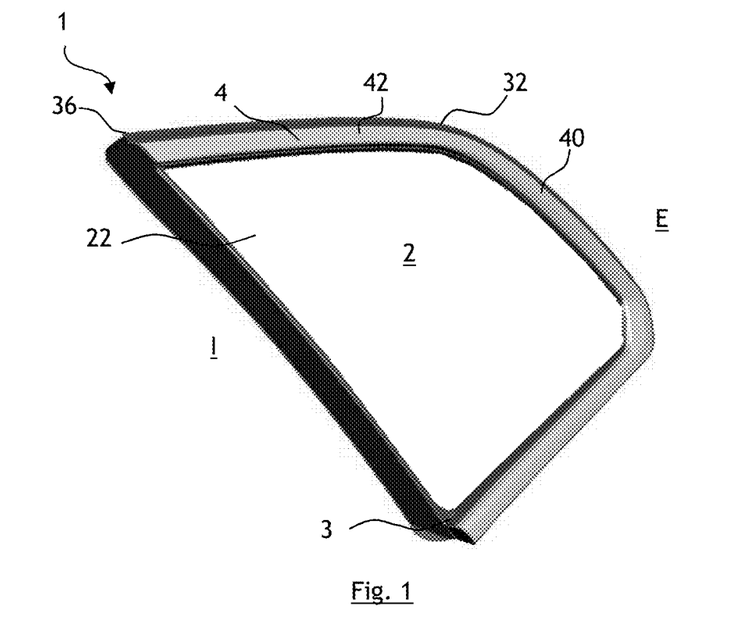
FIG. 1 illustrates a perspective view of a glazing according to the invention, the glazing being viewed from the outside.
Figure 2:
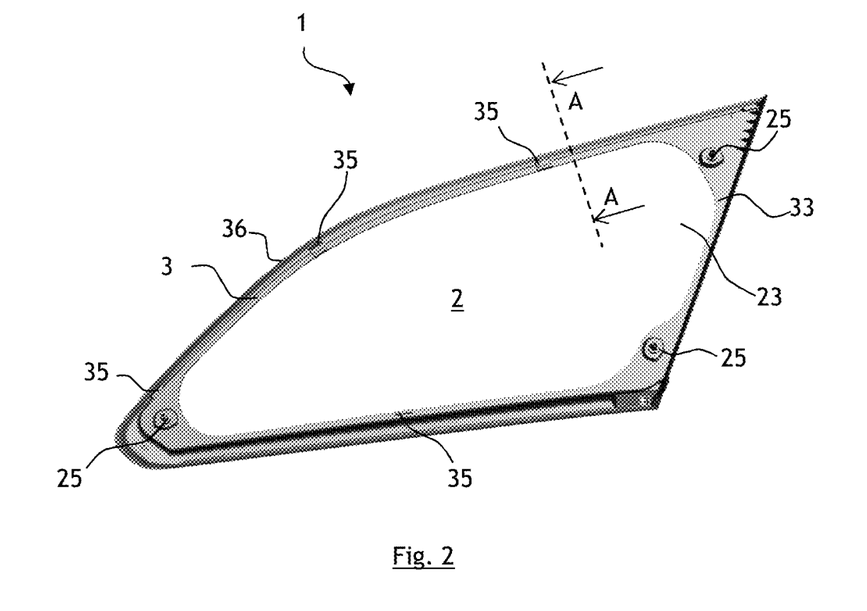
FIG. 2 is a perspective view of the glazing of FIG. 1, the glazing being viewed from the inside.

The present invention relates to a glazing 1, and in particular a vehicle glazing as visible in FIGS. 1 and 2.

This glazing comprises a glazed element 2, at least one profiled seal portion 3 fixed to the glazed element, at least one attached component, such as a trim 4 fixed directly to said profiled seal portion 3; in the case of the invention, there is no intermediate fixing component fixed on the one hand to the trim 4 and on the other hand to said profiled seal portion 3, between these two elements.

The glazing 1 according to the invention which is illustrated is a fixed rear side window glazing of a motor vehicle (rear quarterlight). It comprises a glazed element 2 which is fitted with a portion of a profiled seal (or bead) portion 3 made from a flexible polymer material which runs all around the glazed element 2.

The glazing 1, which potentially also comprises one (or more) accessory and in particular one (or more) accessory for attaching the glazing, is intended to close an opening that marks a boundary between an interior space I of the vehicle and an exterior space E outside the vehicle. The glazed element 2 thus has an exterior face 22 intended to face toward the exterior space E, an interior face 23 intended to face toward the interior space I, and a peripheral edge face 21.

The glazed element may be monolithic, which means to say made up of a single sheet of material, or may be composite, which means to say made up of several sheets of material between which is inserted at least one layer of adhesive material in the case of laminated glazings. The sheet(s) of material may be mineral, in particular glass, or organic, in particular plastic.

In the case of a vehicle glazing, the glazing generally has, at least partially at its periphery, a decorative band (not illustrated).

When the glazed element is made of an organic material, it has been manufactured prior to the implementation of the invention by molding the material of which the glazed element is made in a molding device comprising a mold comprising at least one fixed mold part and one mobile mold part which is able to move with respect to the fixed mold part, said mold parts collaborating, when the mold is closed, during the molding step, to form a molding cavity which, in cross section, has the cross-sectional shape of the glazed element. Often, the glazed element made of organic material is not flat but curved.

When the glazed element is made of mineral material, it has been manufactured prior to the implementation of the invention by melting mineral material into a flat sheet, then by cutting this sheet and possibly bending and/or tempering this sheet.

In FIGS. 1 to 3, the glazed element 2 is a monolithic glazing. The glazing illustrated is a fixed glazing, but the present invention may also apply to a mobile glazing.

The profiled seal portion 3 thus has an exterior face 32 which is intended to face toward the outside E of the vehicle, and an interior face 33 which is intended to face toward the inside I of the vehicle.

The polymer material of which the profiled portion 3 is made may be a thermoplastic (PVC, TPE, etc.), a polyurethane, or even a synthetic rubber of the EPDM type, or any other suitable material.

The profiled seal portion 3 is preferably manufactured by implementing a manufacturing method known as "encapsulation" because it comprises a step of molding the profiled seal portion 3 in a molding device, between two molding elements, one molding element accommodating the interior face of the glazing and one molding element accommodating the exterior face of the glazing, these two molding elements being closed on one another during the molding step while at the same time producing between them a molding cavity which is filled with the material of which the profiled seal portion is made during the step of molding of this profiled seal portion.

The profiled seal portion 3 is preferably arranged around the entire periphery of the glazing 1, although this profiled seal portion could very well be positioned on only part of the periphery of the glazing or on an arbitrary part of the glazing.

The trim 4 has an elongate shape which extends along at least one edge of the glazed element 2 and which in this instance extends along three edges of the glazed element: a bottom edge, a rear edge and a top edge. The trim 4 has, in cross section, an overall shape with a base 40 and at least one flange 41 extending at a non-zero angle from the base, the base being situated over an exterior face 32 of said profiled seal portion 3.

In the figures, the trim 4 thus covers a portion of the exterior face 32 of the profiled seal and in particular a longitudinal boss 31 which extends all the way along the trim 4, under the base 40.

It is in order to improve the esthetic appearance of the glazing that part of the profiled seal portion 3 visible from the outside of the vehicle is hidden by the trim 4.

The trim is prefabricated: it has been manufactured, and possibly shaped, prior to being attached to the glazing. It may be made of aluminum, aluminum alloy, steel and in particular stainless steel.

The material of which it is formed preferably has an elastic modulus comprised between $80 \cdot 10^3$ MPa and $500 \cdot 10^3$ MPa so as to exhibit high rigidity.

The trim has a complex shape: in cross section it has a shape with a central base 40 and at least one flange 41, 41' extending from said base. This flange 41 or these flanges 41, 41' here (each) extend from one transverse end of the base 40. This shape is positioned upside down with the base situated uppermost or, more specifically here, on, the exterior face of said profiled seal portion 3 so as to cover the boss 31. The interior face 42 of the trim is thus in contact with the exterior face 32 of the profiled seal portion 3 at least along the part furthest toward the outside of the boss 31.

Figure 4:
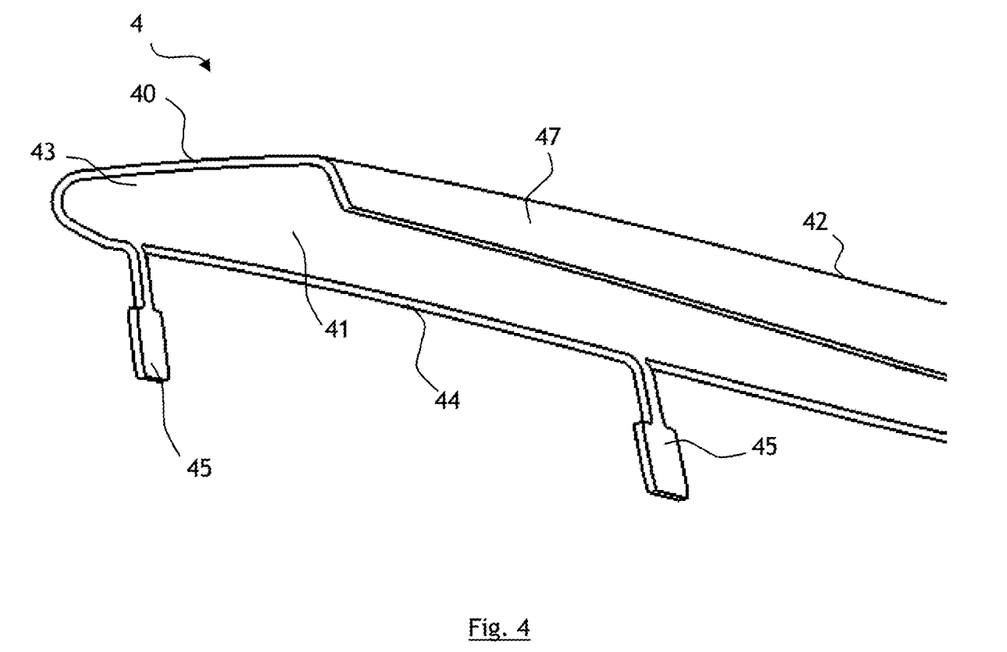
FIG. 4 is a partial perspective view illustrating the trim of FIG. 3 and showing several tabs on the same flange.

According to the invention, as visible in FIGS. 3 and 4, viewed in cross section (which means to say transversely with respect to said elongate direction of the trim), a distal flange 41 of the trim comprises at an opposite end to the base 40 at least one tab 45 and preferably several tabs 45.

This tab 45 (and preferably these tabs 45) is (or are) present in the profiled seal portion 3 while penetrating said profiled seal portion 3 via a hole 30 that opens onto said exterior face 32 and does not open onto an interior face 33 of said profiled seal portion 3; furthermore this tab 45 (and preferably these tabs 45) is (or are) wholly in contact with the profiled seal portion 3, from the end 44 of the flange that bears the tab and over the entire height of the tab (or tabs); this tab 45 (and preferably these tabs 45) is (or are) embedded in the profiled seal portion 3.

The hole in which the (or each of the) tab(s) is (or are) hidden has a shape that complements the tab.

The flange 41 that bears the tab (or tabs) 45 is preferably longitudinal; and preferably along the entire length of the trim.

The tab 45, and preferably each tab 45, is solid and thus has no aperture, or in other words no opening, through which material of the profiled seal 3 could then pass.

When there are several tabs 45, in order to fix the trim 4 to the profiled seal portion 3, each of the tabs 45 is in a hole 30 that opens onto the exterior face 32 and does not open onto the interior face 33 of said profiled seal portion 3 and each tab 45 is wholly in contact with said profiled seal portion 3.

The hole 30, or each hole 30, is preferably formed during the manufacture by molding of the profiled seal portion 3.

As visible in the figures, the tab 45, or each tab, is in the extension of the flange that bears it and here is preferably formed as an integral part of the flange that bears it; the trim is, in this instance as a single piece of metal, made up of a simple (not bent-over double) metal sheet of a thickness for example of 0.4 mm to 2 mm, which is then bent.

FIG. 3 shows that, in proportion, the thickness of the profiled seal portion 3 is relatively small outside of the zone in which the tab 45 is present, and thicker in the zone in which the tab 45 is present; the profiled seal portion 3 thus has, on the interior face 33, a local boss 35 facing the tab 45, and only facing the tab 45, making it possible to plan for more profiled seal portion material and thus better anchorage of the tab in the material of the profiled seal portion. This boss 35 may act as an end stop for the thickness of the adhesive (not illustrated) used to bond the glazing into the bodywork opening. This in particular illustrates the benefit of the invention for configurations in which the space available between the edge face 21 of the glazed element and the adjacent bodywork (not illustrated) is small.

Here, the overall width of this boss 35 is greater than the overall width L of said tab by approximately 2 mm on each side.

As can be seen in FIG. 3, the tab 45, or each tab, preferably has a length L comprised between 0.5 and 2 times its height w measured from the end 44 of the flange 41; here, the ratio is 1:1.

The tab 45 has the overall shape of an inverted T, a trunk of the T being formed as an integral part of the flange 41. It is therefore not possible to remove the tab 45 and, therefore, the trim 4, without damaging the hole in which the tab lies and therefore the profiled seal portion.

Figure 5:
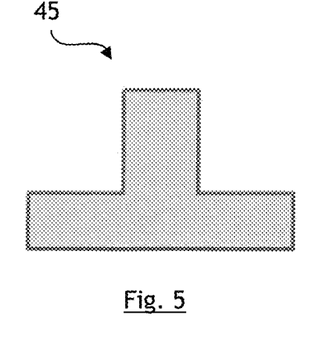
FIGS. 5, 6 and 7 illustrate three embodiments of tab.
Figure 6:
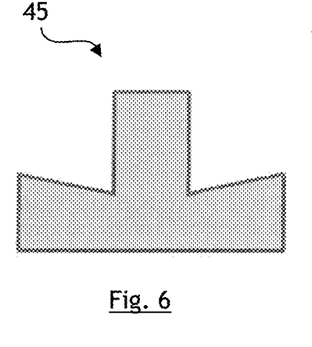
Figure 7:
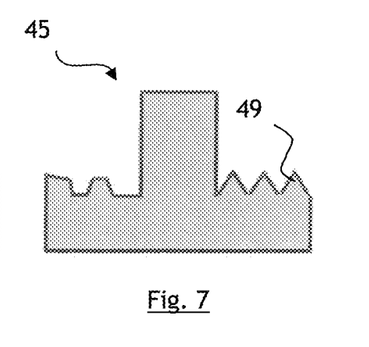

FIGS. 5 to 7 illustrate various alternative forms of embodiment of the overall inverted-T shape:
in FIG. 5, the branches of the T are straight, of the same height over their entire length,
in FIG. 6, the branches of the T are chamfered toward the trunk, which means to say that they are not as tall toward the trunk, and
in FIG. 7, the branches of the T each have at least one tooth 49, for example a triangular or parallelepipedal tooth, which extends toward the flange 41, and preferably each have several teeth.

These alternative forms can of course be combined with one another on one branch or on both branches.

In absolute terms, it is possible to create an L-shaped tab 45, which means to say one shaped like a T as illustrated but with just one branch; however, that then generates an imbalance in the retention of the trim by the profiled seal portion.

The trim 4 is held against the interior face 33 by the tab 45 (or the tabs 45), embedded in the profiled seal portion.

The profiled seal portion 3 is thus in contact with the interior surface 43 of the base 40 with no adhesion-promoting layer interposed between the base 40 and the profiled seal portion 3 and even with no adhesion-promoting layer interposed between the trim 4 and the profiled seal portion 3.

For even better retention still, the flange 41 is preferably in contact with the profiled seal portion 3 over at least part of its height, and preferably over its entire height. This contact is preferably on each longitudinal side of the flange 41.

It is possible for the trim to be straight along its length. However, it is entirely possible for the trim to be curved along its length and to be present on two adjacent sides of the glazed element, or even on three sides of the glazed element as illustrated in FIGS. 1 and 2, or even all around the glazed element.

It is then possible for the trim to comprise at least two tabs 45 on each of the sides of the glazed element which are provided with the trim.

It is possible to optimize the retention achieved by the tabs according to their respective positions in space so as to have retention in the three dimensions of space.

FIGS. 3 and 4 moreover show that, in particular when viewed in cross section at the point at which a tab is present, and preferably all along the length of the trim, according to a first alternative form of embodiment of the invention, the trim 4 has the overall shape of a U, with a first flange 41 which comprises at least one tab 45 and a second flange 47 of the U of the trim which penetrates a cavity 34 formed on the exterior face 32 of said profiled seal portion 3, said cavity not opening onto the interior face 33 of said profiled seal portion 3.

In this first alternative form, this second flange 47 has no tab.

This second flange 47 is preferably the proximal flange of the U, which is the one closest to the glazed element when mounted and said first flange 41 is then the distal flange of the U, the one furthest from the glazed element when mounted, so as to have more space in the profiled seal portion to accommodate the tab 45.

In an alternative form which has not been illustrated it is possible to plan for the trim 4 to have the overall shape of an L, with the base 40 penetrating a cavity formed on the exterior face 32 of the profiled seal portion 3, this cavity not opening onto the interior face 33 of the profiled seal portion 3.

Figure 8:
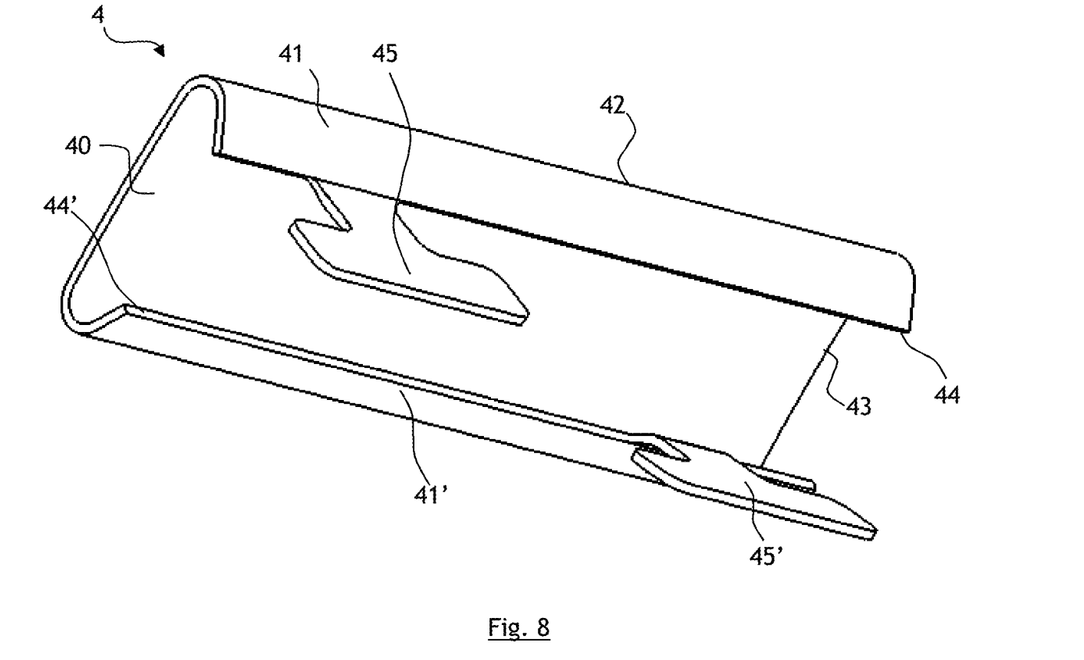
FIG. 8 is a partial perspective view equivalent to FIG. 4 for another alternative form of embodiment of a trim, with tabs on two flanges.

FIG. 8 shows a second alternative form of the invention, viewed in cross section at the point at which a tab is present, in which the trim 4 has the overall shape of a U, with
as for the first alternative form, a first flange 41 which comprises at an opposite end 44 to the base 40 at least a first tab 45, this first tab 45 being present in the profiled seal portion 3 while penetrating said profiled seal portion 3 via a hole that opens onto said exterior face 32 and does not open onto an interior face 33 of said profiled seal portion 3 and the tab 45 being wholly in contact with the profiled seal portion 3, and
unlike in the first alternative form, a second flange 41' which comprises at an opposite end 44' to the base 40 at least a second tab 45', this second tab 45' being present in said profiled seal portion 3 while penetrating said profiled seal portion 3 via a hole that opens onto said exterior face 32 and does not open onto an interior face 33 of said profiled seal portion 3 and the second tab 45' being wholly in contact with the profiled seal portion 3.

The tabs 45 and 45' are preferably longitudinally offset (which means to say do not face one another) in order to improve the retention of the tabs in the profiled seal portion.

The invention claimed is:
1. A glazing comprising a glazed element, at least one profiled seal portion, at least one trim having an elongate shape which extends along an edge of said glazed element and which in cross section has an overall shape with a base and at least one flange extending at a non-zero angle from said base, said base being situated above an exterior face of said profiled seal portion, wherein said at least one flange comprises, at an opposite end to said base, at least one tab which is present in said at least one profiled seal portion while penetrating said at least one profiled seal portion via a hole that opens onto said exterior face and does not open onto an interior face of said at least one profiled seal portion and an entire external surface of said at least one tab being wholly in direct contact with said at least one profiled seal portion.

2. The glazing as claimed in claim 1, wherein, on the inside of said at least one profiled seal portion, at least one external section of said at least one tab is greater than an internal section of said hole on the exterior face of said at least one profiled seal portion.

3. The glazing as claimed in claim 1, wherein said at least one tab has a thickness identical to that of said at least one flange and a length comprised between 0.5 and 2 times a height of said at least one tab measured from the end of said at least one flange.

4. The glazing as claimed in claim 1, wherein said at least one profiled seal portion has, on the interior face, a boss facing said at least one tab.

5. The glazing as claimed in claim 1, wherein, viewed in cross section, said at least one trim has the overall shape of a U, with a first flange which comprises at least said at least one tab and a second flange which penetrates a cavity formed on the exterior face of said at least one profiled seal portion and which does not open onto the interior face of said at least one profiled seal portion.

6. The glazing as claimed in claim 1, wherein, viewed in cross section, said at least one trim has the overall shape of a U and said at least one flange comprises a first flange and a second flange, with said first flange comprising, at an opposite end to said base, at least a first tab of said at least one tab, said first tab being present in said at least one profiled seal portion while penetrating said at least one profiled seal portion via a hole that opens onto said exterior face and does not open onto an interior face of said at least one profiled seal portion and said first tab being wholly in contact with said at least one profiled seal portion, and said second flange comprising, at an opposite end to said base, at least a second tab of said at least one tab, said second tab being present in said at least one profiled seal portion while penetrating said at least one profiled seal portion via a hole that opens onto said exterior face and does not open onto an interior face of said at least one profiled seal portion and said second tab being wholly in contact with said at least one profiled seal portion.

7. The glazing as claimed in claim 1, wherein said at least one profiled seal portion is in contact with an interior surface of said base.

8. The glazing as claimed in claim 1, wherein said at least one tab has the overall shape of an inverted T, a trunk of the T being formed as an integral part of said at least one flange.

9. The glazing as claimed in claim 8, wherein said at least one tab has the overall shape of an inverted T with at least one branch of the T chamfered toward the trunk or at least one branch of the T which has at least one tooth extending toward said at least one flange, or both at least one branch of the T is chamfered toward the trunk and at least one branch of the T which has at least one tooth extends toward said at least one flange.

10. The glazing as claimed in claim 1, wherein said at least one profiled seal portion is in contact with said at least one flange over at least part of a height of said at least one flange.

11. The glazing as claimed in claim 10, wherein said at least one profiled seal portion is in contact on a longitudinal side of said at least one flange.

12. The glazing as claimed in claim 1, wherein during a molding process, said at least one profiled seal portion is formed by molding on said glazed element wholly in contact with said at least one tab.

13. The glazing as claimed in claim 12, wherein the hole is formed during the molding process of said at least one profiled seal portion.

* * * * *